United States Patent [19]
Fung

[11] Patent Number: 5,125,011
[45] Date of Patent: Jun. 23, 1992

[54] APPARATUS FOR MASKING DATA BITS

[75] Inventor: Michael G. Fung, Cupertino, Calif.

[73] Assignee: Chips & Technologies, Inc., San Jose, Calif.

[21] Appl. No.: 749,630

[22] Filed: Aug. 19, 1991

Related U.S. Application Data

[63] Continuation of Ser. No. 479,444, Feb. 13, 1990, abandoned.

[51] Int. Cl.⁵ .............................................. H03K 21/40
[52] U.S. Cl. .................................... 377/73; 377/54; 377/111
[58] Field of Search ................ 377/54, 70, 73, 69, 377/111; 364/947.4

[56]  References Cited
U.S. PATENT DOCUMENTS 4,034,301  7/1977  Kashio ................................. 377/54
4,396,829  8/1983  Sugihara et al. ..................... 377/73
4,866,742  9/1989  Fujiyama et al. .................... 377/70
4,893,028  1/1990  Beltramini ........................... 377/73

Primary Examiner—John S. Heyman
Attorney, Agent, or Firm—Townsend and Townsend

[57]  ABSTRACT

A system for masking bits in a configuration. The system has a bus with first and second sets of bit lines. A line from the first set is paired with aline from the second set; the paried lines are coupled to each cell in the configuration register. A logic circuit is connected to each register cell and the corresponding paired lines. Depending upon the state of the bit signal of the second set bit line, the logic circuit passes the bit signal on the first set bit line for loading into the register cell or reloads the bit line signal already in the register cell. In this manner, masking operations in the configuration register can be performed very quickly.

14 Claims, 2 Drawing Sheets

APPARATUS FOR MASKING DATA BITS

This is a continuation of application Ser. No. 07/479,444 filed Feb. 13, 1990, now abandoned.

BACKGROUND OF THE INVENTION

The present invention is related to bit masks. More particularly, the present invention is directed to an apparatus and method for masking bits held in a configuration register in a single operation through the use of a masking circuit.

The masking of bits in the registers, particularly configuration registers, of computer systems is necessary in a wide variety of applications. If the entire configuration register needs to be updated, it can be accomplished by a simple write operation. However, during normal operation, it is often necessary to update less than the entire configuration register.

In this case a series of steps must be performed. First, a lock operation must be performed to prevent reading of the configuration register while the data are being masked. Second, the data are read out of the configuration register. Third, the data are masked. Fourth, the new data are written back into the configuration register. And finally, the configuration register is unlocked.

This series of steps requires manipulation of the data in the configuration register which results in a delay in the system before the configuration register can be accessed. To minimize system delay and increase performance results it is desirable to provide a more efficient masking technique when less than the entire configuration register must be updated.

SUMMARY OF THE INVENTION

The present invention provides an apparatus for minimizing the delays caused by the masking procedure of data in the configuration registers.

According to the present invention, a masked register has a plurality of cells, each cell holding one bit of information. The register is coupled in parallel to a bus with a first set of bit lines. One bit line of the bus is connected to one register cell so that the bits on the bus can be loaded into the register in one step. The bus also has a second set of bit lines which can receive mask bits.

Associated with each register cell is a logic circuit which is connected between the cell and the bus. The logic circuit is connected to the corresponding bit line which carries the bit datum for loading into the register cell and a bit line from the second set. Depending upon the state of the mask bit signal on the second set bit line, the logic circuit either passes the bit datum on the first bit line for loading into the register cell or maintains the bit already in the register cell.

Thus the each bit in the register can be masked individually and directly in one operation. The present invention significantly improves write timing and diagnostic and configuration software. In addition, register savings can be achieved since it is not necessary to preserve the bit mask in a separate register.

For a more complete understanding of the nature and advantages of the invention, reference should be made to the ensuing detailed description, taken in conjunction with the accompanying drawings.

DETAILED DESCRIPTION OF THE PRESENT INVENTION

Figure 1:
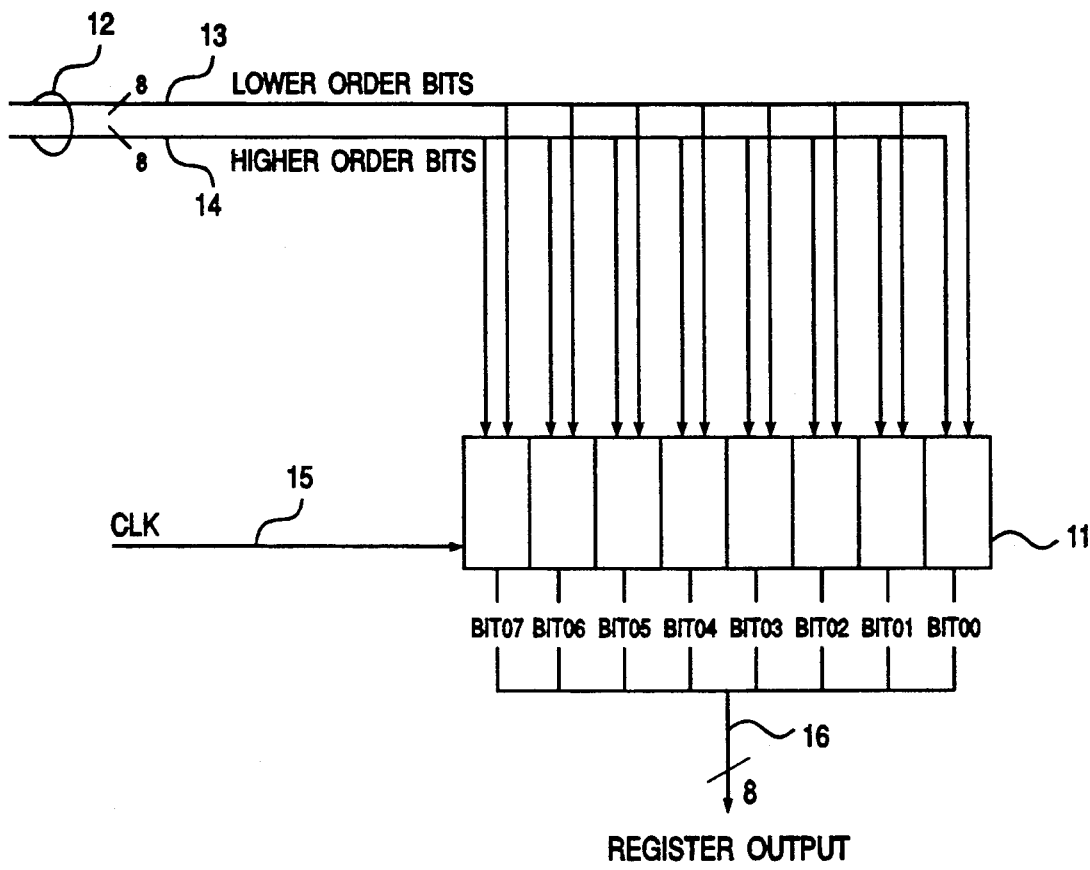
FIG. 1 is a block diagram illustrating the present invention.

FIG. 1 is a diagram illustrative of the present invention. A configuration register 11 of 8-bits is connected to an input bus 12 of 16 bit lines. The bus 12 has a first set 13 of bit lines lines carrying the lower order bits of the bus (bits 00–07), while a second set 14 of 8 bit lines carry the higher order bits (bits 08–15). The register 11 is also connected to an output bus 16.

The configuration register 11 is divided into 8 modified cells for holding the lower order bits from the bus 12. Like other registers, each cell holds one bit of information. A typical register has a plurality of flip-flop circuits, each capable of holding one bit of information. If the register is connected to bus in parallel, each flip-flop is connected to one line in the bus.

However, each cell in the register 11 is connected to a pair of bit lines, one from each set 13, 14 so that each bit from the first set bit line 13 is paired with a corresponding bit from the second set bit line 14. In FIG. 1, bit 00 is paired with bit 08. Other paired bits include bit01/bit09, bit02/bit10 . . . bit07/bit15.

The data to be loaded into the configuration register 11 are the lower order bits on the first set 13 of bit lines. The higher order bits (bits 08–15) form the mask bits. Depending upon the state of the bit signal on its associated second set bit line, each register cell either loads the bit information on its associated first set bit line or maintains the bit already in the register cell. This operation occurs upon each clock cycle on a signal line 15 which is connected to each cell of the configuration register 11. In this manner, the masking operation of the register 11 is performed on one step with individual bit information for the register capable of being modified.

Figure 2:
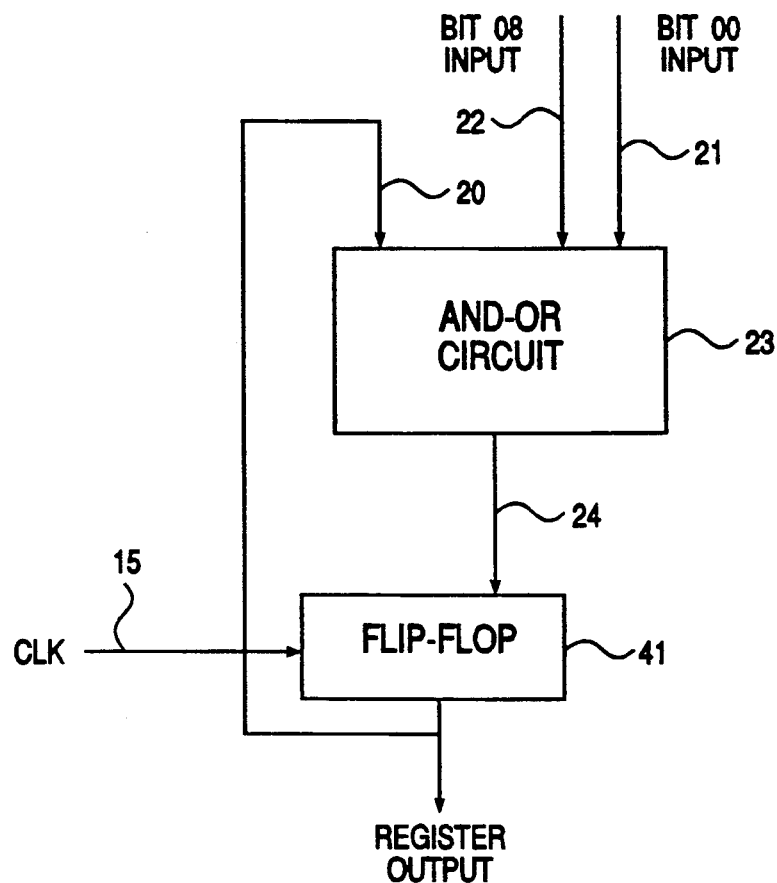
FIG. 2 is a block diagram showing the logic circuit and flip-flop associated with a register cell in accordance with the present invention.

FIG. 2 illustrates a single extended register cell of the configuration register 11. The cell is extended in the sense that additional circuitry is associated with the flip-flop of the typical register. For simplicity, the register cell associated with the bit pair 00/08 is shown. In addition to a typical flip-flop circuit 41 which holds the bit of information for the register cell, the cell has an AND-OR logic circuit 23. The logic circuit is connected to a first set bit line 21 (bit 00) and a second bit line 22 (bit 08) as input lines. The logic circuit 23 is also connected to the output line of the flip-flop 41 by a feedback line 20. A line 2 connects the output of the logic circuit 23 with the input of the flip-flop 41.

The logic circuit 23 operates so that if the mask bit 08 is a logic "1," i.e., a logic "1" is placed on line 22, then the bit signal (bit 00) on the first set bit line 21 is passed to the output line 24. At a predetermined part of the clock cycle signal on line 15, typically the rising edge, the flip-flop 41 will load the signal from the line 21. On the other hand, if the mask bit 08 is a logic "0," i.e., a logic "0" is placed on line 22, then the bit signal on the feedback line 20 is passed to the output 24. At the proper clock cycle, the flip-flop 41 reloads the bit information which the flip-flop 41 had been holding. The register cell maintains the same bit information.

Figure 3:
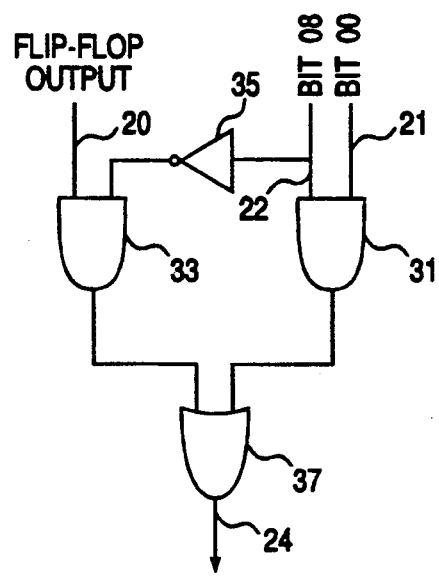
FIG. 3 is a schematic representation of the logic circuit shown in FIG. 2.

FIG. 3 is a schematic representation of a single AND-OR circuit 23 in accordance with the present invention. It should be understood that one such AND-OR circuit is associated with each configuration register cell being masked. The circuit includes two AND gates 31, 33, one OR gate 37, and an inverter gate 35.

The first input of AND gate 31 is connected to the bit 00 of the bus (line 21) while the second input is connected to the bit 08 of the bus (line 22). The bit 08 carries the masking bit. A first input of AND gate 33 is connected to receive an inverted version of the bit mask input through the inverter 35, while a second input is connected to the flip-flop 41 output by the feedback line 20 (FIG. 2). The OR gate 37 has two inputs, each receiving an output of the AND gates 31, 33. The output of the OR gate 37 is connected to the input terminal of the flip-flop 41.

Thus the detailed operation of each register cell is as follows with reference to FIGS. 2 and 3. Initially, data is loaded into all 8 register cells of the configuration register 11 by placing the desired data on the first set bit lines 13 of bus 12 (bits 00–07). A bit mask of all "1's" input is placed on the second set bit lines 14 of the bus 12 (bits 08-15). Then all the bits 00–07 are loaded into the register 11.

Subsequently, if a change is desired to any or all bits in the configuration register, a "1" is applied to the appropriate second set bit line as a mask bit and the desired information placed on the corresponding first set bit line for loading into the configuration register. If no change is desired to a bit position, a "0" is applied to the corresponding second set bit line and the bit datum on the corresponding first set bit line is rendered into a "DON'T CARE" state.

Operationally, each bit in bits 00–07 is transmitted to the AND-OR circuit 23 for each register cell through the first set bit lines 13. The AND gate 33 receives the output from the configuration register flip-flop 41. If a "0" has been sent on the mask bit line 22, no change will be made to that configuration register location. The "0" on the bit mask line 22 is inverted to a "1" by the inverter 35 so that the bit datum already in the flip-flop 41 appears on the output of AND gate 33. At the same time, the bit mask "0" places a "0" on the output of the AND gate 31. Thus the OR gate 37 combines these two outputs and send the bit datum already in the register cell flip-flop 41 back to the flip-flop 41. The flip-flop 41 is reloaded with its previous bit.

On the other hand, if a change is desired in a desired bit location in the register, a "1" is placed on the corresponding mask bit line 22 of the second set bit lines 14. This places a "0" at the input of the AND gate 33 rendering a "0" output for the AND gate 33. At the same time, a "1" on the bit mask line 22 to the AND gate 31 ensures that bit datum on the corresponding first set bit line 13 appears at the output of the AND gate 31. The OR gate 37 receives the "0" from the AND gate 33 and the output from AND gate 31. Thus, the output from the AND gate 31 is loaded into the flip-flop 41 for that register cell.

In general, to those skilled in the art to which this invention relates, widely differing embodiments and applications of the present invention will suggest themselves without departing from the spirit and scope of the invention. For instance, logic signals can be reversed by modifying the appropriate logic gates. Different bus arrangements may be used to mask the cells of a configuration. For example, one second set bit line could control the mask operation of more than one register cell; a single second set bit line could control the masking operation for all the register cells. In addition, the present invention may be implemented with other registers, besides configuration register 11. Thus, the disclosures and description herein are purely illustrative and are not intended to be in any sense limiting. The scope of the invention is set forth in the appended claims.

What is claimed is:

1. A register system comprising:
    a plurality of register cells, each cell holding a bit;
    a bus having a plurality of data bit lines and a plurality of enable bit lines, each of said data bit lines respectively coupled to one of said register cells, each of said enable bit lines respectively coupled to one of said register cells; and
    a plurality of logic circuits, each respectively connected to said each register cell, said data bit line, and said enable bit line, each said logic circuit passing the bit signal on said data bit line to said register cell or ignoring said data bit line signal thereby maintaining the signal held in said register cell in response to a first state of or a second bit signal on said enable bit line.

2. The system as in claim 1 wherein each logic circuit comprises:
    an AND-OR circuit connected to said data bit line, said enable bit line, an output line from said register cell, and an input line to said register cell, said AND-OR circuit passing said bit signal on said data bit line or said bit signal in said register cell output line to said register input line responsive to said bit signal on said enable bit line.

3. The system as in claim 2 wherein said AND-OR logic circuit comprises
    a first AND logic gate having first and second input terminals connected respectively to data and enable bit lines, and an output terminal;
    an inverter having an input terminal and an output terminal, said input terminal connected to said enable bit line;
    a second AND logic gate having first and second input terminals, said first input terminal connected to said register cell output line, and said second input terminal connected to inverter output terminal; and
    an OR circuit having first and second input terminals and an output terminal, said first input terminal connected to said first AND logic gate output terminal, said second input terminal connected to said second AND logic gate output terminal, and said output terminal connected to said register cell input line.

4. The system as in claim 2 wherein said register cell comprises a flip-flop circuit having an input terminal and an output terminal, said input terminal connected to said register cell input terminal and said output terminal connected to said register cell output terminal.

5. A system for individually controlling bits in a register, said register having a plurality of cells, each cell holding a bit, comprising:
    a bus having a plurality of first and second bit lines, each of said first bit lines respectively coupled to one of said register cells, each of said second bit lines respectively coupled to one of said register cells; and
    a plurality of logic circuits, each logic circuit respectively connected between said one of said register cells and said respectively coupled first and second bit lines, said logic circuit passing a bit signal on said first bit line to said register cell or ignoring said first bit line signal thereby maintaining a bit signal in said register cell in response to a first or a second sate of a bit signal on said second bit line;

whereby said bit signals on said second bit lines operate as a masking signals for said register.

6. The system as in claim 5 wherein said register comprises a configuration register.

7. The system as in claim 5 wherein the number of register cells is eight.

8. The system as in claim 5 wherein each logic circuit comprises:

an AND-OR circuit connected to said first bit line, said second bit line, an output line from said register cell, and an input line to said register cell, said AND-OR circuit passing said bit signal on said first bit line or said bit signal in said register cell output line to said register input line responsive to said bit signal on said second bit line.

9. The system as in claim 8 wherein said AND-OR logic circuit comprises a first AND logic gate having first and second input terminals connected respectively to first and second bit lines, and an output terminal;

an inverter having an input terminal and an output terminal, said input terminal connected to said second bit line;

a second AND logic gate having first and second input terminals, said first input terminal connected to said register cell output line, and said second input terminal connected to inverter output terminal; and an OR circuit having first and second input terminals and an output terminal, said first input terminal connected to said first AND logic gate output terminal, said second input terminal connected to said second AND logic gate output terminal, and said output terminal connected to said register cell input line.

10. The system as in claim 9 wherein said register cell comprises a flip-flop circuit having an input terminal and an output terminal, said input terminal connected to said register cell input terminal and said output terminal connected to said register cell output terminal.

11. The system as in claim 10 wherein said flip-flop circuit is responsive to a clock signal such that said flip-flop circuit latches said bit signal on said register cell input terminal upon said clock signal.

12. The circuit of claim 5, wherein said first bit lines carry data signal and said second bit lines carry enable signals.

13. The circuit of claim 5, wherein said first bit lines are low-order bit lines of the bus and said second bit lines are high-order bit lines of the bus.

14. The circuit of claim 13, wherein selected bits are read into the plurality of register cells in a single operation, said selected bits being determined from bits on the second bit lines.

* * * * *